United States Patent [19]

Franzke

[11] Patent Number: 4,534,286
[45] Date of Patent: Aug. 13, 1985

[54] HAM MOLD CLOSING APPARATUS

[75] Inventor: Jürgen Franzke, Bad Essen, Fed. Rep. of Germany

[73] Assignee: Roscherwerke GmbH, Osnabruck, Fed. Rep. of Germany

[21] Appl. No.: 564,994

[22] Filed: Dec. 23, 1983

[30] Foreign Application Priority Data

Nov. 9, 1983 [DE] Fed. Rep. of Germany ... 8332147[U]

[51] Int. Cl.³ .............................................. B30B 1/34
[52] U.S. Cl. ...................................... 100/219; 99/351; 100/269 R; 100/910
[58] Field of Search ......................... 99/349, 350, 351; 100/910, 269 R, 219, 240, 245; 426/523

[56] References Cited

U.S. PATENT DOCUMENTS

| 1,209,276 | 12/1916 | Finn | 100/219 |
|---|---|---|---|
| 1,388,082 | 8/1921 | Wolff | 100/910 X |
| 1,624,808 | 4/1927 | Scholten | 99/351 |
| 1,851,582 | 3/1932 | Janssen | 99/351 |
| 3,646,881 | 3/1972 | Rathjen | 99/351 |

FOREIGN PATENT DOCUMENTS

| 735733 | 11/1932 | France | 99/351 |
|---|---|---|---|
| 1213004 | 3/1960 | France | 100/910 |

Primary Examiner—Billy J. Wilhite
Attorney, Agent, or Firm—Sprung Horn Kramer & Woods

[57] ABSTRACT

An apparatus for closing a ham mold, in which at least one two-part mold, consisting of a container and of a cover that fits loosely into it, is positioned in a chamber that can be vacuumized. The cover can be moved in relation to the container in order to compress a ham that has been placed in the mold. The apparatus is equipped with a compression bridge consisting of a strut, compression springs and a securing arm and is positively or non-positively connected to at least one compresion-medium cylinder that is positioned on one wall of the chamber and forces the parts on the mold into one another. A compression beam is positioned in such a way that it can be raised and lowered on two pressure-medium cylinders and that has two points of compression positioned at a distance along the compression-bridge strut and operates non-positively in conjunction with the compression bridge.

9 Claims, 6 Drawing Figures

HAM MOLD CLOSING APPARATUS

BACKGROUND OF THE INVENTION

The present invention relates to an apparatus for closing a ham mold, in which at least one two-part mold, consisting of a container and of a cover that fits loosely into it, is positioned in a chamber that can be vacuumized, the cover, which can be moved in relation to the container in order to compress a ham that has been placed in the mold, being equipped with a compression bridge consisting of a strut, of compression springs, and of a securing arm and positively or non-positively connected to at least one compression-medium cylinder that is positioned on one wall of the chamber and forces the parts on the mold one into one another.

A ham-mold closing machine of this type allows the mold to be closed automatically and economically. Still, since there is only one compression-medium cylinder acting on the compression bridge and since the cover is forced loosely into the container, it is impossible to completely eliminate displacement or tilting of the cover as a result of inadequate positioning devices and irregularly shaped pieces of meat.

SUMMARY OF THE INVENTION

The main object of the present invention is to provide an improved ham-mold closing machine of the aforesaid type that incorporates simple means for automatically and reliably forcing the cover into the container without displacement or tilting.

This object is achieved in accordance with the invention by a compression beam that is positioned in such a way that it can be raised and lowered on two pressure-medium cylinders and that has two points of compression positioned at a distance along the compression-bridge strut and operating non-positively in conjunction with the compression bridge.

Another object of the invention is to provide a ham-mold closing machine with simple means of guiding not only the cover as it travels into the container, but also any of various types of compression bridge as it moves into position against the mold.

This object is achieved in accordance with the invention by a guide beam that is mounted in such a way that it can be raised and lowered on a compression-medium cylinder, that overlaps the compression beam and can be lowered independently of it down to the upper edge of the container, that forces the cover into and secures it in position in the container, and that has two opposing pressure devices that force the securing arms of the compression bridge against the retaining rim of the container.

Other design characteristics that represent practical developments of the means of achieving the aforesaid objects are disclosed herein. For example, the two beams which are nested, which can be raised and lowered independently, and which overlap the compression bridge in both length and breadth, are preferably positioned with their length along the length of the compression bridge. Moreover, three pressure-medium cylinders for the two beams are preferably mounted in a row with their cylinder housings against the hood and with their piston rods extending through a seal in the wall of the hood, with the compression-medium cylinder for the guide beam between the two pressure-medium cylinders for the compression beam.

Further, the compression beam preferably has two parallel and adjacent lateral components in the form of strips or plates positioned at a distance and connected at each longitudinal end by connectors and is loosely connected to the pressure-medium cylinders by retainers attached and preferably screwed to the piston rods, with a U-shaped cross-section of the retainers overlapping a narrower section of the connection and loosely attached at that section by a pin-and-longitudinal hole connection. Each point of compression preferably consists of a compression roller, web, strip, section or similar structure extending on the bottom of the connector preferably on the narrower connection section.

Still further, the guide beam preferably has two lateral components in the form of separated, adjacent, and parallel strips or plates that overlap the outside of the lateral components of the compression beam and are connected at each end by a connector plate and in the middle by an upper base plate and the guide beam is loosely attached, preferably with screws, by its base plate to the piston rod. The lower straight longitudinal edge of each lateral component of the guide beam preferably constitutes a compression edge that operates in conjunction with the cover. Moreover, each of the two terminal pressure devices is preferably mounted on one of the connector plates of the guide beam and consists of a rotating pressure roller that can be moved horizontally on a slide that is mounted subject to adjustable spring tension in a pot-like housing on the connector plate.

The present invention contemplates these features both alone and in combination.

The ham-mold closing apparatus in accordance with the present invention allows simple and reliable automatic closure of the mold and uniform compacting of the meat within it in a sensible and smooth operation. The cover, which lies loosely in and is to be forced into the container, is retained in a horizontal plane as it descends by a guide beam, preventing displacement and tilting even when the shape of the meat is irregular, and accordingly forced into the container reliably and subject to compulsory guidance.

The guide beam with its two points of compression also ensures that the cover will move into the container without tilting and jamming, guaranteeing optimum compression of the mold parts and ham.

The compression devices at the ends of the guide beam and the constant distance between points of compression on the compression beam allow ham molds with different dimension and with compression bridges of different dimension to be employed in the closing machine either because the pressure of the points of compression on the securing arms directly and reliably locks them into place behind the retaining rim of the container, since the points of compression pivot them toward the rim and hold them there so that the compression devices lose their effect, or because the pressure of the points of compression on the compression-bridge strut forces the securing arms against the retaining rim and holds them there, ensuring the lock.

The characteristics of the invention result in reliable and smooth closure of various types of mold and compression bridge at low engineering expense, making the machine very valuable.

A preferred embodiment of the invention will now be described with reference to the attached drawings, wherein

DETAILED DESCRIPTION OF THE PREFERRED EMBODIMENTS

Figure 1:
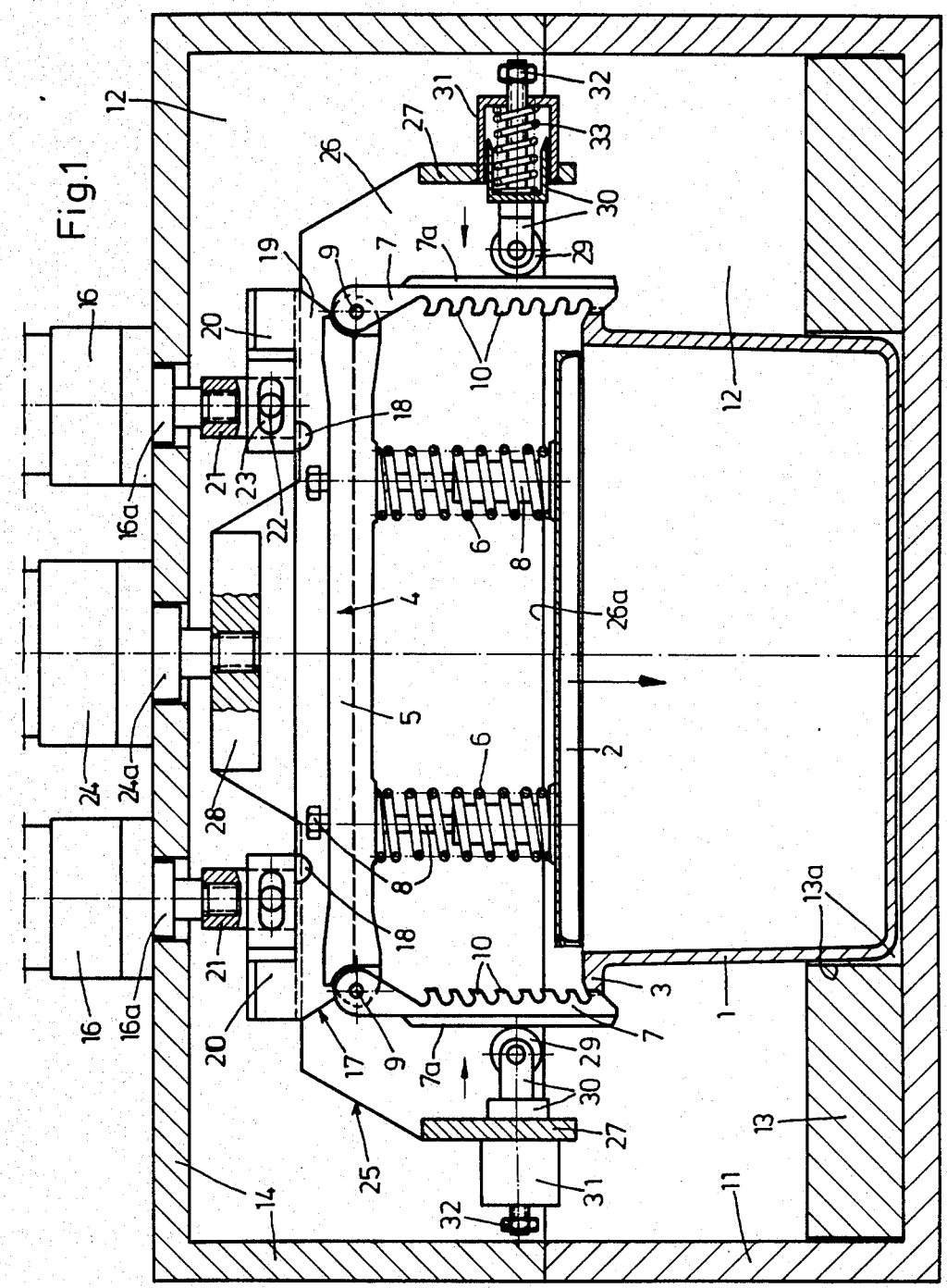
FIG. 1 is a vertical longitudinal section through a vacuum chamber containing a ham mold with a compression bridge and a compression and guide beam that can be activated with pressure-medium cylinders, at the moment that closure is being initiated in accordance with the present invention.

Referring to FIG. 1, a ham mold, which is intended especially for boiled hams and is in itself known, consists of a bottom in the form of a container 1 and of a top in the form of a cover 2 that fits and can be forced into container 1 to compress a ham that has been placed in it. The two parts 1 and 2 are made out of aluminum, special steel, or a similar material.

The open top of container 1 has an outwardly facing continuous retaining rim 3. A compression bridge 4, which can consist of a strut 5, of compression springs 6, and of securing arms 7 engages retaining rim 3, and can force the two parts 1 and 2 together to compress the ham.

Strut 5 extends at least over almost the total length of the mold and is penetrated by two upright rod-like guides 8, such as with adjustable nuts or screws, attached to cover 2 and enclosed in adjustable-tension compression springs 6 that rest against cover 2 and below strut 5. At each end of strut 5 is securing arm 7 that pivots (toward and away from the mold) on a horizontal axis 9. The edge of each arm 7 that faces mold 1 and 2 has teeth 10 that engage below the retaining rim 3 of container 1.

Pressure on strut 5 tensions compression springs 6 and forces cover 2 into container 1, whereupon the teeth 10 on securing arms 7 engage retaining rim 3. When the pressure on strut 5 is interrupted, cover 2 is retained in the position in which it is forced into container 1, in which one particular tooth 10 on each securing arm 7 engages below retaining rim 3. This engaged position is also ensured by the tension on compression springs 6. Since the tension on compression springs 6 also forces cover 2 farther into container 1 as the ham shrinks during the boiling process, the ham is always firmly compressed within the mold even as it shrinks. Securing arms 7 remain in the engaged position while the springs 6 force cover 2 down.

Figure 5:
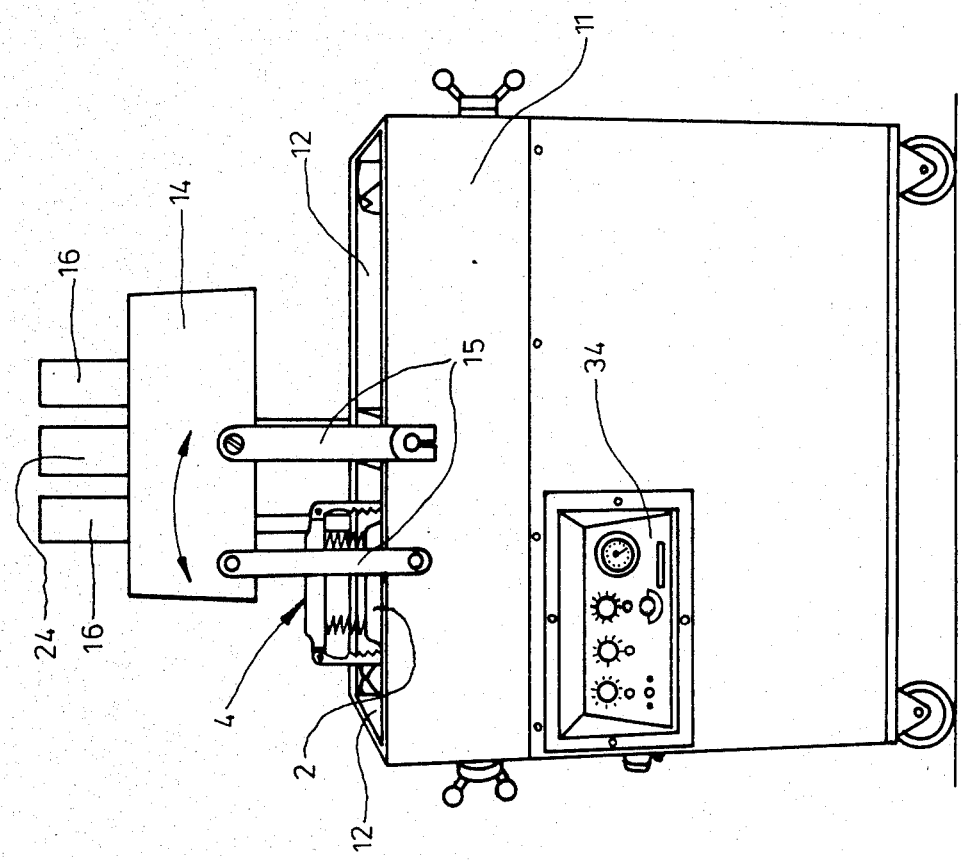
FIG. 5 is a side view of a ham-mold closing apparatus in accordance with the invention with a vacuum chamber containing a ham mold.

The two-part mold 1 and 2 is compressed in a ham-mold closing machine in accordance with the invention as illustrated in FIG. 5. It has at least one chamber 12 that can be vacuumized, that at least one ham mold 1 and 2 can be securely positioned in and that is accommodated in a housing 11. The mold is held in place with a positioner 13, preferably a plate that fits into chamber 12 and has a recess 13a that matches the size and shape of container 1.

The vacuumizable chamber 12 consists of the machine housing 11 and of a hood 14 that can be raised and lowered and preferably raised, lowered, and moved to the side by pivoting arms 15 so that the chamber can be sealed off once mold 1 and 2 has been placed inside it. Hood 14 can also be moved onto and off housing 11 into a sealed or open position on and by means of vertical guides (not shown).

Figure 2:
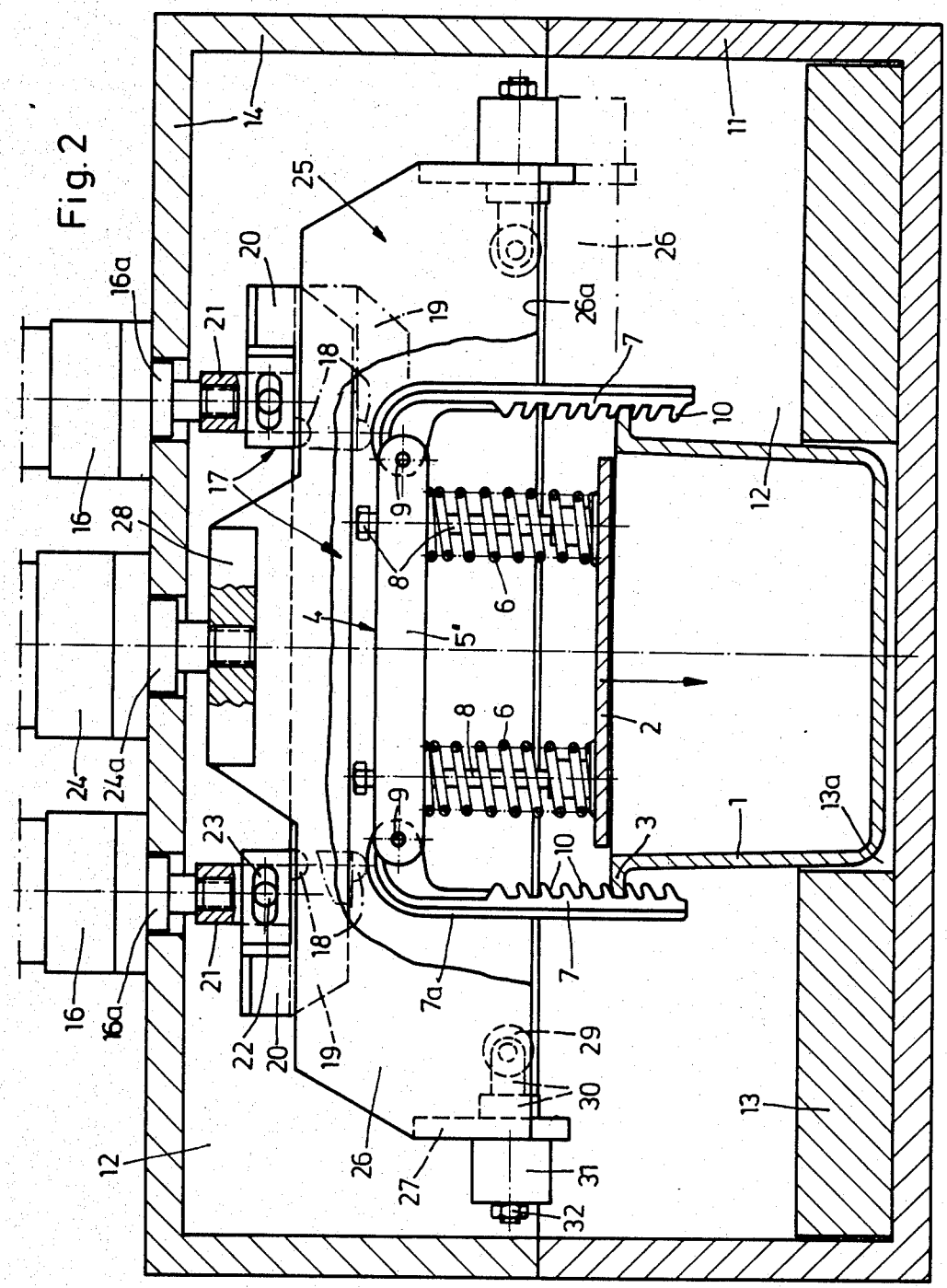
FIG. 2 is a vertical longitudinal section through the same vacuum chamber containing a smaller ham mold with a compression bridge and a compression and guide beam at the moment that closure is being initiated.

Compression bridge 4 and cover 2 are indirectly shifted (lowered) in relation to the stationary container 1 by two pressure-medium cylinders 16 mounted on hood 14. Pressure-medium cylinders 16, which are preferably pneumatic cylinders, are mounted with their cylinder housings upright on hood 14 and their movable piston rods 16a penetrating a seal in the wall of the hood. A compression beam 17 is attached to the two piston rods 16a and has two points 18 of compression that are positioned at a distance along compression-bridge strut 5 and operate non-positively in conjunction with compression bridge 4, applying pressure either to its strut 5 as shown FIG. 1 or to its securing arms 7 as shown in FIG. 2.

Since molds of different sizes will have compression bridges 4 of different lengths and since the bridges will have securing arms 7 that are articulated in different ways, whereas the points 18 of compression on compression beam 17 are at a fixed distance apart, points 18 of compression will engage compression bridge 4 at different locations, either at strut 5 or at securing arms 7.

Compression beam 17 extends along the length of strut 5 and is as long as the longest commercially available compression bridge 4.

Compression beam 17 has two lateral components 19 in the form of strips or plates that extend parallel to each other along it. Components 19 are kept apart and united by a connector 20 at each end. Since the distance between lateral components 19 is greater than the width of compression bridge 4, both components can overlap compression bridge 4 on each side.

Figure 3:
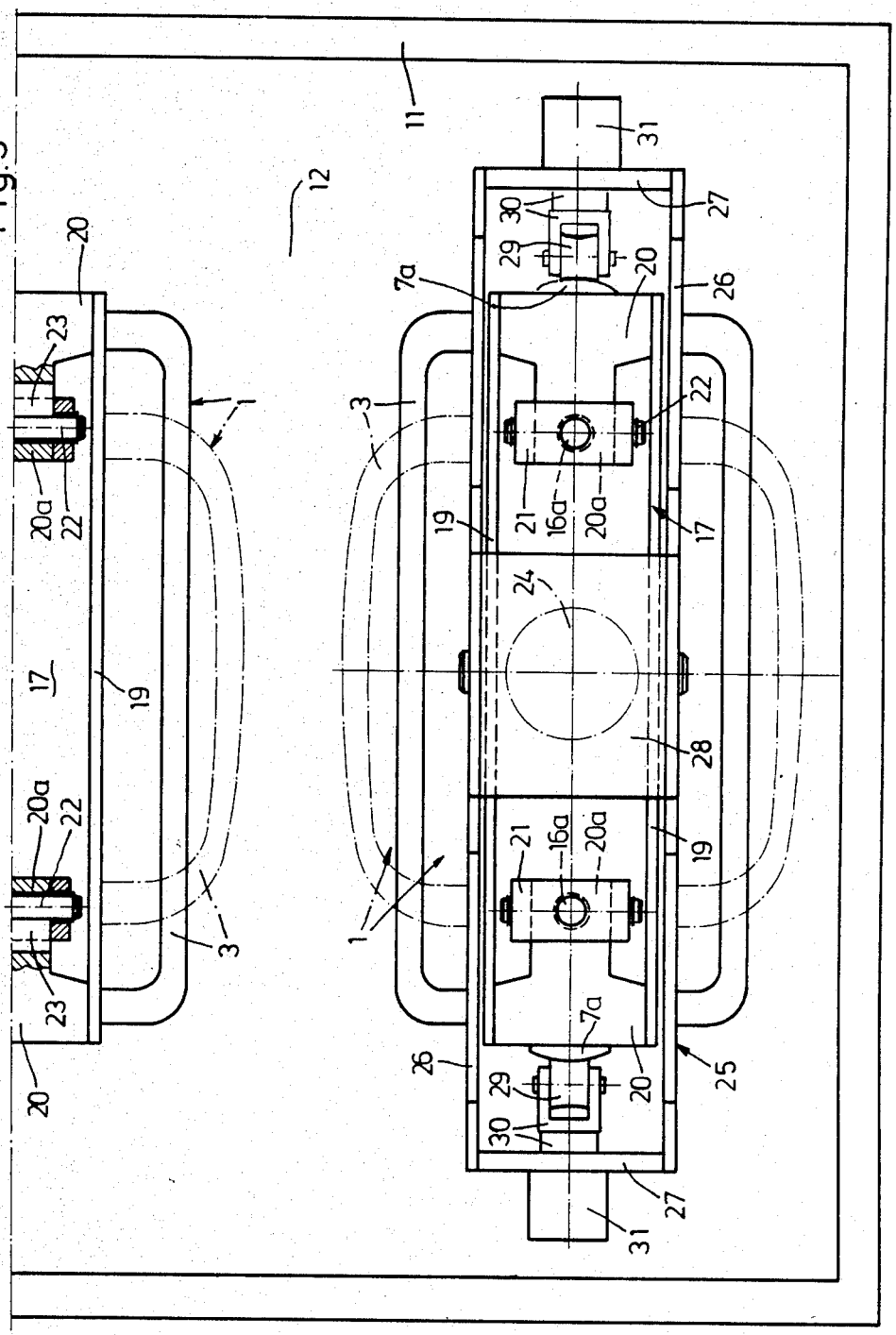
FIG. 3 is a top view of the vacuum chamber containing two adjacent ham molds with their associated compression and guide beams.

A retainer 21 is attached to each piston rod 16a, preferably screwed onto a threaded section, and is articulated to a connector 20. Retainers 21 are preferably U-shaped and overlap connectors 20 at their narrower ends 20a, which are are not connected to lateral components 19 as can be seen from FIGS. 3 and 4. Both retainers 21 and ends 20a are connected by transverse pins 22. To provide compression beam 17 with a certain amount of play in relation to piston rods 16a, each connector 20 has a longitudinal hole 23 penetrated by a transverse pin 22 in such a way that compression bridge 4 (both of its lateral components 19 plus the two connectors 20) can move to a certain extent along its length in relation to retainers 21.

Figure 4:
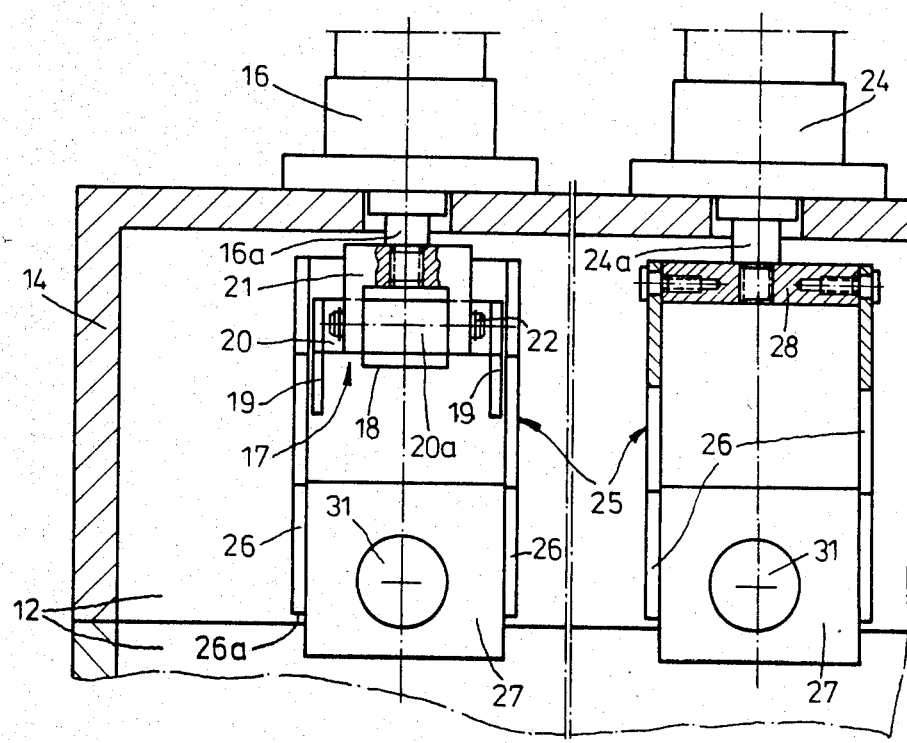
FIG. 4 is a vertical section through two adjacent compression and guide beams, with only the guide beam being illustrated on the right.

Each point 18 of compression is on a connector 20, preferably at the narrower free end 20a, and extends down and out through connector 20 as can be seen from FIGS. 1, 2, and 4.

Points 18 of compression may consist of rollers that rotate in connector 20 or of cast-on or attached webs, sections, or similar structures.

There is another compression-medium cylinder 24, preferably a pneumatic cylinder attached with its cylinder housing to hood 14 between the two pressure-medium cylinders 16. The piston rod 24a of compression-medium cylinder 24 also penetrates through a seal in the hood and is attached to a guide beam 25 in such a way that it can raise or lower it. Guide beam 25 secures (keeps straight) cover 2 in position while it is being lowered and forces securing arms 7 against retaining rim 3 when points 18 of compression directly engage strut 5.

Guide beam 25 has two lateral components 26 in the form of strips or plates that overlap the outside of compression beam 17. Lateral components 26 are kept apart and are united at both ends, which also overlap compression beam 17 along its length, by connector plates 27 and in the middle at the upper longitudinal edge by a base plate 28.

Guide beam 25 is screwed to piston rod 24a and can be raised and lowered independent of compression beam 17 by its own compression-medium cylinder 24 and is lowered down to the upper edge of container 1. At his point the lower, straight longitudinal edges 26a of lateral components 26 rest on cover 2 and move it in a horizontal plane down into container 1.

There is a pressure device, preferably a pressure roller 29, subject to spring tension on each opposing terminal connector plate 27. Each roller 29 acts on its adjacent securing arm 7, forcing it toward container 1 and its teeth 10 under retaining rim 3. Pressure roller 29 is mounted by means of a slide 30 in a pot-shaped housing 31 attached to connector plate 27. A compression spring 33 is positioned between slide 30 and the bottom of housing 31 around a set screw 32 that is connected to the slide.

Compression spring 33 forces slide 30 and pressure roller 29 against securing arm 7. Securing arm 7 has, for example, a guide strip 7a on the outside that has a convex cross-section over which the corresponding concave surface of pressure roller 29 rolls.

The movement of hood 14 and the force and timing of pressure-medium cylinders 16 and 24 are controlled by electric and electronic circuitry that also controls the level and duration of the vacuum. The machine has control panel 34 for this purpose.

How the ham mold or molds is or are closed in the machine will now be described.

A ham is placed in container 1 and cover 2 applied and locked into position by hand with its securing arms 7 under retaining rim 3. Only a little manual pressure is necessary because the ham is not being compressed yet. The closed ham mold is now placed in chamber 12 and fixed in position in positioner 13. Hood 14 is then lowered with the two nested beams 17 and 25 in their uppermost position and at least partly overlapping compression bridge 4 without pressure as shown in FIGS. 1 and 2. The middle piston rod 24a of compression-medium cylinder 24 now emerges and forces guide beam 25 down. The two lateral components 26 of guide beam 25 engage cover 2, forcing it down while retaining its horizontal position into container 1 until the lower edges 26a of lateral components 26 engage retaining rim 3. The lowering motion is terminated and compression-medium cylinder 24 turned off with guide beam 25 resting on container 1, where it remains. Since lateral components 26 force cover 2 down in a horizontal plane, it cannot be tilted or moved to one side by the ham in container 1.

Once compression-medium cylinder 24 has been turned on and guide beam 25 is moving downward, compression beam 17 is also forced down after a delay by the emerging piston rods 16a of pressure-medium cylinders 16 and its two points 18 of compression eventually engage compression bridge 4. Compression beam 17 travels farther down, forcing compression bridge 4 down and, subject to compression springs 6, cover 2 into container 1, compressing the ham. The teeth 10 on securing arms 7 slide over retaining rim 3 and, when compression beam 17 stops moving down, engage behind the rim, securing cover 2 in position.

The strut 5 in the embodiment illustrated in FIG. 1 is long enough for both points 18 of compression to act on the strut directly. In order for the teeth 10 of securing arms 7 to engage behind retaining rim 3, the two spring-loaded pressure rollers 29 at the end of guide beam 25 must force them against the rim.

The strut 5' in the embodiment illustrated in FIG. 2 is shorter than the distance between points 18 of compression and securing arms 7 are angled and pivot on the strut. Thus, both points 18 of compression act on securing arms 7, specifically at a distance from axis 9, so that the points force the arms toward rim 3 by pivoting them around the axis, ensuring that the teeth will come to rest behind the rim. The pressure rollers 29 on guide beam 25 are not employed with this type of ham mold.

A vacuum is generated in chamber 12 before or while the mold is closed inside it, evacuating both the chamber and the inside of the mold which has continuous gap between the cover and the container. The vacuum further compacts the ham in addition to the mechanical compression and is beneficial to the integrity of the meat subsequent to boiling.

Once one or more adjacent molds have been forced together by beams 17 and 25 inside chamber 12 and closed, they are released by raising piston rods 16a and 24a in conjunction with beams 17 and 25 and hood 14 and can be removed by hand from the chamber and made ready for boiling.

It is preferable for the closing machine to have two adjacent chambers 12 and for hood 14 to be capable of being lifted and moved to the side by pivoting arms 15 so that already closed molds can be removed from one chamber and fresh molds placed inside it while other molds are being closed in the other chamber. This is a very efficient means of operation.

This innovative machine can be constructed with one or two chambers and even with a belt, the belt constituting a surface for the molds and the hood with the moving beams 17 and 25 inside it constituting and closing off the chamber. Compression beam 17, which is located inside, can be raised uninterrupted by guide beam 25, which is located outside, and vice versa because of the play between them. The spring-loaded pressure rollers 29 rotate in both travel directions: up and down in relation to the direction of guide beam 25 and down and off of securing arms 7 in relation to that of compression bridge 4 with respect to pressure rollers 29.

Figure 6:
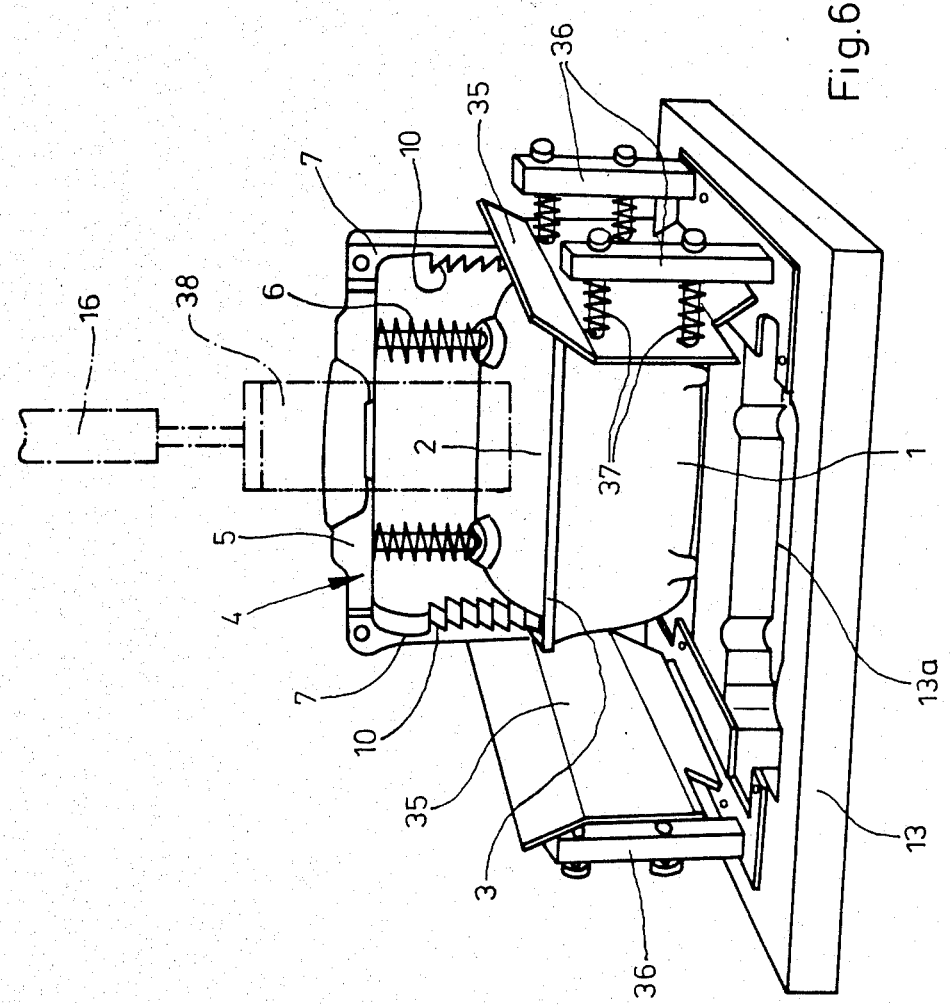
FIG. 6 is a perspective view of another version of a ham mold with a compression bridge and a guide associated therewith in accordance with the present invention.

A guide 35 in the form of a sheet or plate is associated with the securing arms 7 of each compression bridge 4 in the embodiment illustrated in FIG. 6. Guides 35 force arms 7 toward the ham mold so that, when the two halves 1 and 2 are forced together, the arms cannot move out but are always secured against retaining rim 3.

Each guide 35 has several slight angles and slopes and-/or bends toward container 1. One continuous guide 35 for both ham molds is positioned on two opposing sides of positioner 13 that are adjacent to securing arms 7. Each guide 35 is resiliently mounted with intermediate compressions springs 37 facing the mold and the arms on upright mounts 36 that rest on positioner 13. Only one pressure-medium cylinder 16 for example is provided for each mold secured by positioner 13.

Pressure-medium cylinder 16 is located on the semi-longitudinally intersecting ends of strut 5. Its cylinder housing is attached to hood 14 and its piston rod extends through a seal in the hood into chamber 12. A U-shaped positioner 38 is mounted by means of threading or similar structures on the piston rod of each pressure-medium cylinder 16. The downward compression legs of each positioner 38 are prevented from tilting and press down on cover 2.

It will be appreciated that the instant specification and claims are set forth by way of illustration and not limitation, and that various modifications and changes may be made without departing from the spirit and scope of the present invention.

What is claimed is:

1. In a ham mold closing apparatus having a vacuumizable chamber in which at least one two-part mold consisting of a container having a retaining rim and a cover that fits loosely into it is positioned and means for moving the cover, in relation to the container to compress a ham that has been placed in the mold including a compression bridge having a strut, compression springs, and securing arms coactive with the rim and at least one compression-medium cylinder connected to the compression bridge and that is positioned on one wall of the chamber one into the óther, the improvement wherein the moving means further comprises two compression-medium cylinders, a compression beam connected thereto to be raised and lowered by the two pressure-medium cylinders and having two points of compression positioned at a distance along the compression-bridge strut and operating in conjunction with the compression bridge to move the cover in relation to the container.

2. The apparatus as in claim 1, wherein the moving means further comprises a guide beam that overlaps the compression beam, a third compression-medium cylinder for raising and lowering the guide beam independently of the compression beam down to the upper edge of the container to force the cover into and secures it in position in the container and wherein the guide beam has two opposing pressure devices that force the securing arms of the compression bridge against the retaining rim of the container.

3. The apparatus as in claim 2, wherein the guide beam and compression beam are nested, overlap the compression bridge in both length and breadth and are positioned with their length along the length of the compression bridge.

4. The apparatus as in claim 3, wherein the chamber comprises a hood having a wall and the three pressure-medium cylinders for the beams are mounted in a row and have cylinder housings against the hood and have piston rods extending through a seal in the wall of the hood, with the compression-medium cylinder for the guide beam between the two pressure-medium cylinders for the compression beam.

5. The apparatus as in claim 4, wherein the compression beam has two parallel and adjacent lateral portions positioned at a distance, connectors connecting same at each longitudinal end and retainers loosely connecting same to the pressure-medium cylinders, the retainers having attached a U-shaped cross-section overlapping a narrower section of the connectors and loosely attached at that section by a pin-and-longitudinal hole connection.

6. The apparatus as in claim 5, wherein each point of compression comprises means extending from the connector at the narrower section and at a bottom portion of the connector.

7. The apparatus as in claim 5, wherein the guide beam has two lateral portions that overlap the outside of the lateral portions of the compression beam, a connector plate connecting same at each end, an upper base plate connecting same in the middle and means loosely attaching the guide beam at its base plate to the piston rod of the third cylinder.

8. The apparatus as in claim 7, wherein each lateral portion of the guide beam has a lower straight longitudinal edge forming a compression edge that operates in conjunction with the cover.

9. The apparatus as in claim 7, each of the two pressure devices is mounted on one of the connector plates of the guide beam and comprises a rotating pressure roller and means mounting same for sliding horizontal movement subject to adjustable spring tension comprising a pot-like housing on the connector plate.

* * * * *